United States Patent
Hammer et al.

(10) Patent No.: US 9,170,145 B2
(45) Date of Patent: Oct. 27, 2015

(54) METHOD FOR MONITORING THE FUNCTIONING OF A FIELD DEVICE

(75) Inventors: Manfred Hammer, Wehr (DE);
Dietmar Spanke, Steinen (DE);
Herbert Schroth, Schopfheim (DE);
Hans Germann, Schopfheim (DE);
Lieselotte Germann, legal representative, Schopfheim (DE);
Michael Heim, Hausen (DE); Andreas Mayr, Lorrach (DE); Andreas Moller, Rheinfelden (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 857 days.

(21) Appl. No.: 13/327,830

(22) Filed: Dec. 16, 2011

(65) Prior Publication Data

US 2012/0158363 A1   Jun. 21, 2012

(30) Foreign Application Priority Data

Dec. 17, 2010 (DE) .......................... 10 2010 063 430

(51) Int. Cl.
*G06F 15/00* (2006.01)
*G01F 23/284* (2006.01)
(Continued)

(52) U.S. Cl.
CPC ................ *G01F 23/284* (2013.01); *G01D 3/10* (2013.01); *G01F 25/00* (2013.01); *B65H 2557/23* (2013.01); *G05B 23/00* (2013.01); *G05B 2219/31121* (2013.01)

(58) Field of Classification Search
CPC .................... G06F 15/00; G05B 22/00; G05B 2219/31121; B65H 2557/23
USPC .......................................................... 702/183
See application file for complete search history.

(56) References Cited

U.S. PATENT DOCUMENTS

| 5,754,449 A | 5/1998 | Hoshal |
| 6,377,196 B1 * | 4/2002 | Kolsrud et al. ............... 341/118 |

(Continued)

FOREIGN PATENT DOCUMENTS

| DE | 19629588 A1 | 2/1998 |
| DE | 10024959 A1 | 12/2001 |

(Continued)

OTHER PUBLICATIONS

International Search Report.
(Continued)

*Primary Examiner* — John Breene
*Assistant Examiner* — Lynda Dinh
(74) *Attorney, Agent, or Firm* — Bacon & Thomas, PLLC

(57) ABSTRACT

A method for monitoring the functioning of a field device, wherein the field device provides a complex measurement signal, which is produced from a number of individual measurements following one another in time, comprising method steps as follows: the complex measurement signals are stored within a predetermined time window; the occurrence of a predetermined event is monitored in the field device; the stored complex measurement signals are overwritten for the case, in which the predetermined event does not occur within the predetermined time window; for the case, in which the predetermined event occurs within the predetermined time window, both a first defined number of complex measurement signals, which were ascertained in time directly before the occurrence of the event, are frozen, as well as a second defined number of complex measurement signals, which were ascertained in time directly after the occurrence of the predetermined event, are stored.

11 Claims, 2 Drawing Sheets

(51) Int. Cl.
*G01D 3/10* (2006.01)
*G01F 25/00* (2006.01)
*G05B 23/00* (2006.01)

(56) References Cited

U.S. PATENT DOCUMENTS

| 7,046,189 B2 * | 5/2006 | Spanke et al. ............... 342/124 |
| 7,516,043 B2 | 4/2009 | Junk |
| 7,781,737 B2 * | 8/2010 | Zhdaneev ............... 250/339.08 |
| 7,966,141 B2 | 6/2011 | Spanke |
| 2004/0030532 A1 | 2/2004 | Boldt |
| 2005/0028037 A1 | 2/2005 | Junk |
| 2009/0235736 A1 | 9/2009 | Spanke |
| 2010/0169816 A1 * | 7/2010 | Hammer et al. ............... 715/771 |

FOREIGN PATENT DOCUMENTS

| DE | 10052836 A1 | 5/2002 |
| DE | 102004055551 A1 | 5/2006 |

OTHER PUBLICATIONS

English translation of IPR, WIPO, Geneva, Jun. 27, 2013.

* cited by examiner

METHOD FOR MONITORING THE FUNCTIONING OF A FIELD DEVICE

TECHNICAL FIELD

The invention relates to a method for monitoring the functioning of a field device, wherein the field device provides a complex measurement signal, which is produced from a number of individual measurements following one another in time.

BACKGROUND DISCUSSION

In connection with the invention, a complex measurement signal is understood to be composed of a number of individual measurements following one another in time. Concretely, a complex measurement signal is, for example, an echo curve, an envelope curve or spectral values. Echo curves or envelope curves are used for determining or monitoring the fill level of a fill substance in a container by using a travel time method. A spectrum or spectral values, which compose a spectrum, generally serve for the analysis of the composition of a medium. Field devices serving to register and/or influence process variables are often applied in process automation technology as well as in manufacturing automation technology. Measuring devices such as, for example, fill level measuring devices, flow measuring devices, pressure and temperature measuring devices, pH measuring devices, conductivity measuring devices, etc. are applied to register process variables and ascertain the corresponding process variables fill level, flow, pressure, temperature, pH value, and conductivity, respectively. For influencing process variables, actuators, such as valves or pumps, are used, via which e.g. the flow of a liquid in a pipeline or the fill level of a medium in a container is changed. All types of measuring devices and actuators are subsumed under the term 'field devices' used in connection with the invention. In relation to the invention in general it can be said that all devices, which are applied near to the process and deliver or process process-relevant information, are referred to as field devices. In addition to the measuring devices/sensors and actuators named above, units, which are connected directly to a fieldbus and serve for communication with a superordinated unit, such as e.g. remote I/Os, gateways, linking devices and wireless adapters or radio adapters, are also generally referred to as field devices. The Endress+Hauser Group provides a large number of such field devices.

If problems temporarily occur in a field device or in the process, in which the field device is applied, then it is important for service personnel to have measuring signals, which were ascertained during the problem, available, since the measuring signals can possibly include information concerning the irregularities. A diagnostic system for a field device in a process control system is described in U.S. Pat No. 7,516,043 B2, wherein a sensor is connected to a process control apparatus. Furthermore, a computing unit is provided, to which the data of the sensor are fed and which monitors the occurrence of a predetermined event in the process. If there is an event, the data before the occurrence of the event and after the occurrence of the event are stored in a memory unit for a predetermined time span.

In U.S. Pat. No. 7,516,043 B2, one dimensional measured values, such as pressure measurement values, are stored. Such a procedure is not applicable in a fill level measurement, which is based on the travel time principle, or in a spectral analysis. U.S. Pat. No. 7,516,043 B2 presents no solution for having information concerning the functional ability of the corresponding field device available, even at a still later point in time.

SUMMARY OF THE INVENTION

An object of the invention is to provide a method, which enables reliable diagnosis of a field device, which makes complex measurement signals available.

The object is achieved by a method, which has method steps as follows:

The complex measurement signals are stored within a predetermined time window;

the occurrence of a predetermined event is monitored in the field device;

the stored complex measurement signals are overwritten for the case, in which the predetermined event does not occur within the predetermined time window;

for the case, in which the predetermined event occurs within the predetermined time window, both a first defined number of complex measurement signals, which were ascertained in time directly before the occurrence of the event, are frozen, as well as a second defined number of complex measurement signals, which were ascertained in time directly after the occurrence of the predetermined event, are stored. In relation to this, it is to be noted that the storing of the envelope curves or echo curves or the spectrum is synchronized with the measurement. Preferably, for example, a predetermined number of complex measurement signals are stored in a ring memory.

It must be mentioned explicitly that the first defined number of measurements before the occurrence of the event can also be zero, so that only complex measurement signals after the event are stored. This likewise applies to the second defined number of measurements after the occurrence of the event.

An advantageous further development of the method of the invention provides that the monitored event is ascertained based on the complex measurement signal or complex measurement signals following one another in time. It is provided in a special embodiment that the monitored event occurs automatically in a predetermined time interval. The result of this is that all complex measurement signals are stored.

As mentioned above, a fill level measuring device, which ascertains the fill level of a medium in a container by using a travel time method, is preferably used as a field device. In this embodiment the fill level is ascertained based on an echo curve or the corresponding envelope curve.

With a fill level measuring device, the monitored event is, for example, a predetermined signal/noise ratio falling beneath a lower limit, the loss of the desired echo signal reflected on the surface of the fill substance, a measured value ascertained from the complex measurement signal and lying above or below a predetermined limit value, the rate of change of the fill level, when this exceeds or falls below a predetermined limit value. Furthermore, it is provided that the defined event can be freely selected by a user.

An advantageous embodiment of the method of the invention provides that an analytical measuring device, which ascertains the composition of a solution or a gas based on a spectral analysis, is used as a field device.

In connection with the method of the invention, it is seen as especially advantageous when the complex measurement signals, thus especially the data of the echo curve, the envelope curve or the spectrum, are stored in a compressed/reduced form. For this, for example, the maxima of the echo curve, the envelope curve or the spectrum are stored, or only each nth point, with n=2, 3, without limit, of the echo curve, the envelope curve or the spectrum is stored. Other options for reducing the amount of data are described in DE 10024959 A1. Corresponding solutions are also applicable in connection with the method of the invention.

Furthermore, it is provided that the amplitude resolution is reduced to a low bit number, e.g. 8 bits. It is possible to limit the memory requirement to a relatively small size through the embodiments named earlier. Consequently, it is especially provided that the monitoring of the field device is executed in the field device itself.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
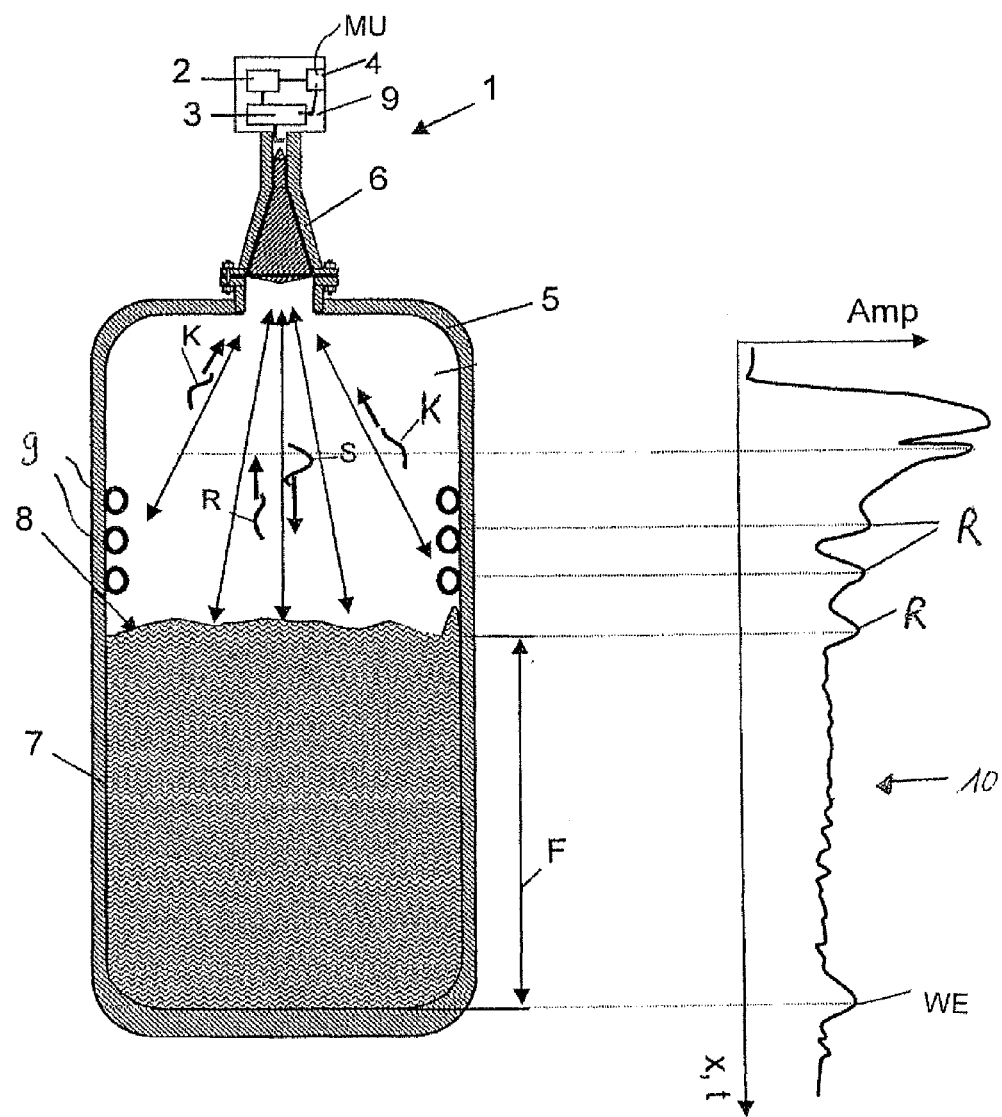
FIG. 1 is radar fill level measuring device using the travel time measuring method.

FIG. 1 shows a measuring device 1 using the travel time measuring method to ascertain the fill level F of a medium 7; measuring device 1 is mounted on the container 5 over a nozzle. Measuring device 1 includes a transmitting/receiving element 6, which freely radiates measuring signals into container 5, and a measurement transmitter 9. Measurement transmitter 9 includes, among other things, a high frequency module 12, a transmitting/receiving unit 3, a control/evaluation unit 4 for the signal processing of the measuring signals and for the control of measuring device 1 and a communication unit 2, which enables communication via a bus system not separately illustrated in FIG. 1. Furthermore, associated with control/evaluation unit 4 is a memory unit MU, in which, among other things, the evaluation algorithm, the measurement parameters and echo parameters are stored. Transmitting/receiving element 6 is embodied as a horn antenna in this example of an embodiment, however, any known antenna form, such as e.g. a rod or a planar antenna or a waveguide in the case of the TDR (Time Domain Reflectometer) method can be utilized as transmitting/receiving element 6. The measuring signals are produced in the form of high frequency transmission signals S in the transmitting/receiving unit 3 and radiated in a fixed radiation pattern toward the medium 7 via the transmitting/receiving element 6. After a travel time t, which is dependent on the traveled distance x, the transmission signals S reflected on the interface 8 of medium 7 are received as echo signals R by transmitting/receiving element 6 and subsequently by transmitting/receiving unit 3. The downstream control/evaluation unit 4 ascertains the so called echo function 10 based on echo signals R; echo function 10 shows the amplitudes of echo signals R as a function of traveled distance x or as a function of the corresponding travel time t. A digitized envelope curve 11 is produced by an analog/digital conversion of analog echo function 10 or echo curve 10. In the following, only the term echo function 10 is used, wherein this term includes the terms echo curve 10, envelope function, or envelope curve.

An echo function 10 showing the current measuring situation in container 5 as a function of travel distance x is likewise presented in FIG. 1. In such case, locations in container 5 are associated with corresponding echo signals R in echo function 10 via reference lines so that the cause and effect relationship can be understood at a glance. The so-called ringing, which arises through reflections in or by an accretion formation on transmitting/receiving element 6 or the nozzle, arises in the beginning region of echo function 10. Furthermore an echo signal K, which is caused by reflection on a disturbance 9 is shown in the beginning region of echo curve 10. In the case shown, the disturbance echo signal K is caused by installed objects 9. For example, installed objects 9 causing disturbance echo signals K can be a stirrer or a supply tube.

The method of the invention is realizable not only in freely radiating radar measuring devices 1. In principle, TDR measuring devices, ultrasound measuring devices or optical travel time measurement systems can also be applied in connection with the method of the invention.

It is important for a highly accurate fill level measurement reliably to identify the wanted echo signal WE, thus the measurement signal fraction reflected on surface 8 of medium 7, and/or to exactly determine the position xR of wanted echo signal 15 in echo function 10 or in digital envelope curve 11. The accuracy of measurement of a fill level measuring device 1 achievable under the given measuring conditions in container 5 depends decisively on the exact determination of the position xR of the wanted echo signal WE in echo function 10.

Figure 2:
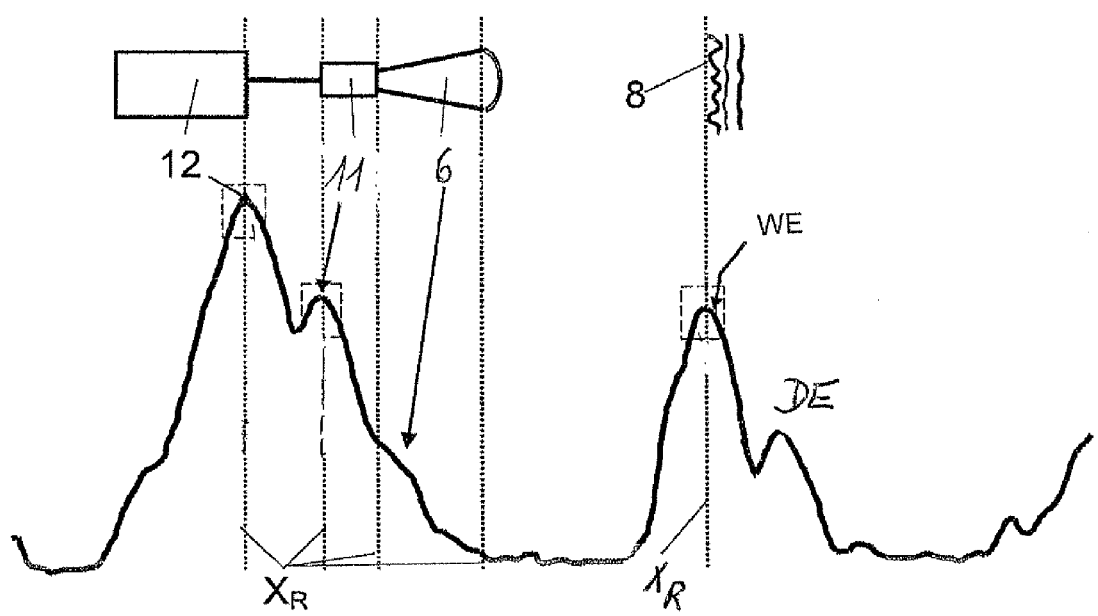
FIG. 2 is a schematic representation of the echo curve of the fill level measuring device shown in FIG. 1.

FIG. 2 shows schematically the echo function 10 of fill level measuring device 1 shown in FIG. 1 at a point in time t. Especially, reflection signals R in echo curve 10 and their causes are shown. Transmission signals S, which, in the case shown, are high frequency pulses, are produced in the electronics module or high frequency module 12 and transmitted via a coaxial cable to the coupling 11. Transmission signals S are decoupled from the coaxial conductor system in coupling 11 and radiated via antenna 6. Impedance jumps occur in the region of transitions from one component to the next; each impedance jump leads to a reflection of a certain signal portion of measuring signals S. These transitions are shown in echo curve 10 in the form of more or less notable reflection signals R.

If transmission signals S radiated by antenna 6 hit the surface, or an interface, 8 of medium 7, then transmission signals S are at least partially reflected back as reflection signals WE. Suitable evaluating methods must especially be provided so that disturbance echo signals R, K or even a double echo signal DE are not interpreted as wanted echo signal WE. A suitable evaluation algorithm is described in the as yet unpublished DE 10 2010 042 525.7 (filing date Oct. 15, 2010) of the assignee.

According to the invention, the functioning of a field device, which provides a complex measurement signal S, is monitored. Especially, information concerning the occurrence of a malfunction should also still be reliably available at a later point in time. A radar fill level measuring device 1 is described in FIG. 1 and FIG. 2. This measuring device 1 delivers a complex measurement signal, echo curve 10, which is obtained by using a number of individual measurements following one another in time.

The method of the invention performs the following method steps: The complex measurement signals, thus, in the concrete case, a plurality of echo curves 10, are stored within a predetermined time window $\Delta T$. At the same time, the occurrence of a predetermined event is continuously monitored. The event is, for example, the loss of wanted echo signal WE reflected on fill substance 7, the signal/noise ratio falling below a lower limit or the exceeding or falling below at least one predetermined limit value e.g. for the fill level F. A measured value, which shows that the echo velocity exceeds or falls below a predetermined limit value, also comes into consideration as an event. Preferably, the user of measuring device 1 has the option to select an event from a provided list of events.

In the following, the predetermined event is preferably ascertained based on complex measurement signal 10. However, an option is also to let the event occur automatically in predetermined time intervals.

For the case, in which the predetermined event does not occur within predetermined time window ΔT, the stored complex measurement signals 10 are cyclically overwritten.

However, if the predetermined event occurs within the predetermined time window ΔT, then both a first defined number of complex measurement signals 10, which were ascertained directly before the occurrence of the event in time, is frozen; and a second defined number of complex measurement signals 10, which were ascertained directly after the occurrence of the predetermined event in time, is stored. Preferably, complex measurement signals 10 are stored in the memory unit MU. Preferably, in connection with the method of the invention, a ring buffer is used for storing echo curves 10, or generally, the complex measurement signals.

The invention claimed is:

1. A method for monitoring a functioning of a field device, for process and manufacturing automation technology, the method comprising:
   storing, by the field device, complex measurement signals within a predetermined time window, wherein the complex measurement signal is provided by a field device, and wherein the complex measurement signal is produced from a number of individual measurements following one another in time; and
   monitoring an occurrence of a predetermined event in the field device;
   wherein the stored complex measurement signals are overwritten which when the predetermined event does not occur within the predetermined time window; and when the predetermined event occurs within the predetermined time window, both a first defined number of complex measurement signals, which were ascertained in time directly before the occurrence of the predetermined event, are stored, along with a second defined number of complex measurement signals, which were ascertained in time directly after the occurrence of the predetermined event, are stored, wherein: the event to be monitored is ascertained based on the complex measurement signals following one another in time.

2. The method as claimed in claim 1, wherein:
   the monitored event occurs automatically and all complex measurement signals are stored.

3. The method as claimed in claim 1, wherein:
   a fill level measuring device serves as a field device which ascertains fill level of a medium in a container by uses a travel time method.

4. The method as claimed in claim 3, wherein:
   the fill level is ascertained based on an echo curve, an intermediate signal, a high frequency signal, or a corresponding envelope curve.

5. The method as claimed in claim 1, wherein:
   an analytical measuring device serves as a field device, which ascertains a composition of a solution or a gas based on a spectral analysis.

6. The method as claimed in claim 1, wherein:
   the predetermined event is selected by a user.

7. The method as claimed in claim 1, wherein:
   for a fill level measuring device, the event is at least one of the following events: loss of the echo signal (WE) reflected on a fill substance; signal-noise ratio falling below a lower limit; exceeding or falling below at least one predetermined limit value; and echo velocity exceeding a predetermined limit value.

8. The method as claimed in claim 1, wherein: data of the echo curve, an envelope curve or a spectrum is stored in a compressed or reduced form.

9. The method as claimed in claim 8, wherein:
   maxima of the echo curve, an envelope curve or the spectrum is stored, or wherein only each nth point integer, with n =2, 3, . . . , of the echo curve, the envelope curve or the spectrum is stored.

10. The method as claimed in claim 1, wherein:
    a resolution of the measurement signal is reduced to a low bit number, near an amplitude.

11. The method as claimed in claim 1, wherein:
    the monitoring of the field device is performed in the field device.

* * * * *